United States Patent
Nakagawa et al.

(10) Patent No.: US 12,011,860 B2
(45) Date of Patent: Jun. 18, 2024

(54) INJECTION APPARATUS

(71) Applicant: THE JAPAN STEEL WORKS, LTD., Tokyo (JP)

(72) Inventors: Yutaka Nakagawa, Tokyo (JP); Toshio Toyoshima, Tokyo (JP); Takehiko Yanagiya, Tokyo (JP)

(73) Assignee: THE JAPAN STEEL WORKS, LTD., Tokyo (JP)

(*) Notice: Subject to any disclaimer, the term of this patent is extended or adjusted under 35 U.S.C. 154(b) by 0 days.

(21) Appl. No.: 17/198,172

(22) Filed: Mar. 10, 2021

(65) Prior Publication Data
US 2021/0299926 A1 Sep. 30, 2021

(30) Foreign Application Priority Data
Mar. 26, 2020 (JP) .................................. 2020-055997

(51) Int. Cl.
*B29C 45/53* (2006.01)
*B29C 45/54* (2006.01)
(Continued)

(52) U.S. Cl.
CPC ............ *B29C 45/531* (2013.01); *B29C 45/54* (2013.01); *B29C 45/60* (2013.01); *B29C 45/62* (2013.01); *B29C 45/82* (2013.01)

(58) Field of Classification Search
CPC .............................. B29C 45/531; B29C 45/54
(Continued)

(56) References Cited

U.S. PATENT DOCUMENTS 2,446,497 A * 8/1947 Thomas ............... F02M 41/066
123/449
2,576,451 A * 11/1951 Hulsing ................. F02M 59/26
239/90
(Continued)

FOREIGN PATENT DOCUMENTS

CN 1313932 A 9/2001
CN 1509829 A 7/2004
(Continued)

OTHER PUBLICATIONS

Office Action dated Oct. 31, 2023, in Japanese Patent Application No. 2020-055997.
(Continued)

*Primary Examiner* — Jacob T Minskey
*Assistant Examiner* — Wayne K. Swier
(74) *Attorney, Agent, or Firm* — Potomac Law Group, PLLC

(57) ABSTRACT

A screw can be driven along an axial direction of a heating barrel and rotatable. An injection piston drives the screw along the axial direction. An injection hydraulic cylinder is partitioned into a first chamber in which pressured hydraulic oil for driving the injection piston is supplied and a second chamber from which hydraulic oil is discharged, and drives the injection piston in the axial direction by hydraulic pressure. A first oil discharge port is blocked by the injection piston when the injection piston advances to a holding pressure switching position. A second oil discharge port can discharge the hydraulic oil from the front chamber regardless of the position of the injection piston. The first oil discharge port is disposed at a position opposed to the first oil discharge port across a center axis of the injection hydraulic cylinder, and is connected to the first oil discharge port.

5 Claims, 12 Drawing Sheets

(51) Int. Cl.
  *B29C 45/60* (2006.01)
  *B29C 45/62* (2006.01)
  *B29C 45/82* (2006.01)

(58) Field of Classification Search
  USPC .................................................. 425/542
  See application file for complete search history.

(56) References Cited

U.S. PATENT DOCUMENTS

| | | | | |
|---|---|---|---|---|
| 3,145,660 | A | * | 8/1964 | Bush .................. F04B 9/10 |
| | | | | 123/46 R |
| 3,613,169 | A | * | 10/1971 | Ziegler ............... B29C 45/5008 |
| | | | | 366/267 |
| 3,951,388 | A | * | 4/1976 | Schrammel ........... B29C 45/531 |
| | | | | 366/78 |
| 4,861,259 | A | * | 8/1989 | Takada ............... B29C 45/6771 |
| | | | | 425/451.2 |
| 6,389,809 | B1 | | 5/2002 | Niidome et al. |
| 2007/0289442 | A1 | * | 12/2007 | Waller ................. B60T 8/4031 |
| | | | | 92/172 |
| 2008/0164002 | A1 | | 7/2008 | Yurko et al. |
| 2014/0102293 | A1 | | 4/2014 | Miller et al. |
| 2022/0032520 | A1 | | 2/2022 | Yanagiya et al. |

FOREIGN PATENT DOCUMENTS

| | | | | |
|---|---|---|---|---|
| CN | 102039648 | A | | 5/2011 |
| CN | 102310517 | A | | 1/2012 |
| CN | 103158236 | A | | 6/2013 |
| CN | 104797792 | A | | 7/2015 |
| GB | 196494 | A | * 4/1923 | ............. F16N 13/04 |
| JP | S56-144802 | U | | 10/1981 |
| JP | H07-299835 | A | | 11/1995 |
| JP | 2000-202610 | A | | 7/2000 |
| JP | 2000-313038 | A | | 11/2000 |
| JP | 2007-216285 | A | | 8/2007 |
| JP | 2010-279995 | A | | 12/2010 |
| JP | 2011-016141 | A | | 1/2011 |
| JP | 2022-24590 | A | | 2/2022 |

OTHER PUBLICATIONS

Office Action issued Jan. 24, 2024, in Chinese Patent Application No. 202110319694.5.

* cited by examiner

INJECTION APPARATUS

INCORPORATION BY REFERENCE

This application is based upon and claims the benefit of priority from Japanese patent application No. 2020-55997, filed on Mar. 26, 2020, the disclosure of which is incorporated herein in its entirety by reference.

BACKGROUND

The present disclosure relates to an injection apparatus and, for example, relates to an injection apparatus of a metal injection molding machine for performing injection molding of metal such as magnesium alloy and aluminum alloy.

Metal injection molding machines are widely used to form products by filling a cavity in a mold with molten metal material. As an example of injection molding used in such a metal injection molding machine, it has been proposed that an injection apparatus of a metal injection molding machine having a configuration in which a speed of an injection piston is rapidly reduced to shift a process from an injection process to a pressure holding process (Japanese Unexamined Patent Application Publication No. 2007-216285).

FIG. 11 shows a schematic configuration of an injection apparatus 1000 of a metal injection molding machine. The injection apparatus 1000 has a heating barrel 101 and a screw 102 disposed in a heating barrel 101 so as to be freely driven in an axial direction and a rotational direction. Molding material is charged into the heating barrel 101 from a hopper 103, and the charged material is molten by frictional heat and shear heat generated due to rotation of the screw 102 and heat applied from a heater 104 disposed on the outer periphery of the heating barrel 101. The molten material is kneaded by the rotation of the screw 102 and sent to the front of the heating barrel 101. A nozzle 105 is attached to a tip of the heating barrel 101. When the material is injected, the molten molding material held at the tip of the heating barrel 101 is injected through the nozzle 105 into a cavity 107 of a mold 106 that is closed.

The screw 102 is rotationally driven by a motor 108 and axially driven by an injection piston 110 disposed inside an injection hydraulic cylinder 109.

The injection hydraulic cylinder 109 is partitioned into two chambers by the injection piston 110, and a front chamber 111B is disposed in a front portion (−X side) and a rear chamber 111A is disposed in a rear portion (+X Side). Pressure oil accumulated by a hydraulic pump 112 to an accumulator 113 is provided to the rear chamber 111A through a flow control valve 114. The front chamber 111B is provided with a first oil discharge port 115A completely or mostly blocked by the injection piston 110 at a desired holding pressure switching position of the injection piston 110, and a second oil discharge port 115B not blocked by the injection piston 110 even at the most forward position of the injection piston 110. The first oil discharge port 115A is formed on a side face of the injection hydraulic cylinder 109, and the second oil discharge port 115B is formed on an end face of the injection hydraulic cylinder 109.

The first oil discharge port 115A is connected to an oil tank 117 through a flow control valve 116, and has an opening area large enough to discharge the hydraulic oil stored in the front chamber 111B to the oil tank 117 in the injection process. The second oil discharge port 115B is connected through a flow control valve 118 to the oil tank 117, and the hydraulic oil in the front chamber 111B is discharged into the oil tank 117 through the second oil discharge port 115B in the pressure holding process. As long as the hydraulic oil can be flowed at a flow rate in the pressure holding process and at a flow rate for retreating the injection piston 110 (+X direction) in a measuring process through the second oil discharge port 115B, the opening area of the second oil discharge port 115B may be smaller than that of the first oil discharge port 115A.

The injection molding mainly includes the measuring process, the injection process, and the pressure holding process. In the measuring process, solid molding material is fed from the hopper 103 into the heating barrel 101, and the screw 102 is driven rearward in the axial direction (+X direction) by the injection hydraulic cylinder 109 while being rotationally driven by the motor 108. Thus, the material is molten and sent forward (−X direction) inside the heating barrel 101 to measure the material. In the injection process, when a measured value reaches a predetermined value, the screw 102 is driven forward in the axial direction (−X direction) by providing the pressure oil to the injection hydraulic cylinder 109, and the measured molten material is injected from the nozzle 105 into the cavity 107 of the mold 106. The pressure holding process is a process of applying pressure to the material in the mold 106 through the material remaining in the heating barrel 101 to compensate for shrinkage caused by cooling of the material after the injection of the material has been finished. These steps allow the material to be molded into a desired shape of the cavity 107.

SUMMARY

FIG. 12 shows a general injection apparatus 1000 in a state in which the injection piston 110 blocks the first oil discharge port 115 A. In FIG. 12, sealing members 119A to 119C such as guide rings and oil seals are provided to prevent leakage of hydraulic oil. The sealing member 119A is disposed to seal between an inner surface of an opening on the −X side of a housing 109A and a shaft connected to the injection piston 110. The sealing member 119B is disposed to seal between the inner surface of the housing 109A of the injection hydraulic cylinder 109 and the injection piston 110. The sealing member 119C is disposed to seal between the inner surface of the opening on the +X side of the housing 109A and the shaft connected to the injection piston 110.

In the injection apparatus 1000, the hydraulic oil is discharged from the first oil discharge port 115A at a large flow rate, and the hydraulic oil is discharged from the second oil discharge port 115B at a flow rate smaller than that of the first oil discharge port 115A. Therefore, as shown in FIG. 12, when the injection piston 110 has advanced in the −X direction and the first oil discharge port 115A has been completely or mostly blocked, the pressure applied to the side surface S11 (Indicated by thick lines) of the side surface of the injection piston 110 rapidly decreases (For example, atmospheric pressure).

On the other hand, the hydraulic oil around the injection piston 110 is discharged through the second oil discharge port 115B having a small flow rate in the area other than the side surface S11, so that the pressure of the hydraulic oil becomes high (Indicated by dashed lines). As a result, the pressure of the hydraulic oil applied to the side surface S12 opposed to the side surface S11 across the center axis of the injection piston 110 becomes high. As a result, an eccentric load F from the side surface S12 toward the side surface S11 is applied to the injection piston 110.

Since the eccentric load is applied to the injection piston 110 every time injection molding is performed, the breakage of the injection piston 110 and the eccentric wear and breakage of peripheral parts such as the guide ring and the oil seal supporting the injection piston 110 may occur.

The present invention has been made in view of the aforementioned circumstances and aims to provide an injection apparatus for a highly durable metal injection molding machine capable of rapidly reducing a speed of an injection piston.

Other challenges and novel features will become apparent from the description herein and the accompanying drawings.

An aspect of the present disclosure an injection apparatus including: a heating barrel; a screw configured to be capable of being driven along an axial direction of the heating barrel and disposed in the heating barrel to be rotatable around the axial direction; an injection piston configured to be connected to the screw to drive the screw in the axial direction; an injection hydraulic cylinder configured to drive the injection piston housed therein in the axial direction by hydraulic pressure, inside of the injection hydraulic cylinder being partitioned into a first chamber in which pressured hydraulic oil for driving the injection piston is provided and a second chamber from which hydraulic oil is discharged; a first oil discharge port disposed in the injection hydraulic cylinder to be blocked by the injection piston when the injection piston advances to a holding pressure switching position and configured to discharge the hydraulic oil from the second chamber; a second oil discharge port disposed in the injection hydraulic cylinder in such a manner that the hydraulic oil can be discharged from the second chamber regardless of a position of the injection piston; and an oil discharge mechanism disposed in the second chamber at a position opposed to the first oil discharge port with respect to a center axis of the injection hydraulic cylinder and configured to discharge the hydraulic oil from the second chamber. Thus, it is possible to advantageously prevent an eccentric load from being applied to the injection piston.

An aspect of the present disclosure is the injection apparatus described above, in which it is preferable that the oil discharge mechanism is configured as an oil discharge port that is disposed in the second chamber at the position opposed to the first oil discharge port with respect to the central axis of the injection hydraulic cylinder and discharges the hydraulic oil from the second chamber. Thus, since positions where the low pressure is applied by discharging the hydraulic fluid from the opposed positions can be opposed to each other, it is possible to advantageously prevent the eccentric load from being applied to the injection piston.

An aspect of the present disclosure is the injection apparatus described above, in which it is preferable that the oil discharge mechanism is configured as a flow path disposed in the injection hydraulic cylinder so as to annually extend around the central axis of the injection hydraulic cylinder from a position opposed to the first oil discharge port to the first oil discharge port. Thus, positions where the low pressure is applied can be disposed to surround the injection piston and thereby it is possible to advantageously prevent the eccentric load from being applied to the injection piston.

An aspect of the present disclosure is the injection apparatus described above, in which it is preferable that the oil discharge mechanism includes: a recess disposed in the injection hydraulic cylinder at a position opposed to the first oil discharge port with respect to the central axis of the injection hydraulic cylinder; and a flow path connecting the recess and the first oil discharge port. Thus, since positions where the low pressure is applied by discharging the hydraulic fluid from the opposed positions can be opposed to each other, it is possible to advantageously prevent the eccentric load from being applied to the injection piston.

An aspect of the present disclosure is the injection apparatus described above, in which it is preferable that a shape and size of an opening of the recess are the same as a shape and size of an opening of the first oil discharge port. Thus, since areas and sizes of positions where the low pressure is applied can be the same, it is possible to more advantageously prevent the eccentric load from being applied to the injection piston.

An aspect of the present disclosure is the injection apparatus described above, in which it is preferable that a flow rate of the hydraulic oil in the second oil discharge port is smaller than a flow rate of the hydraulic oil in the first oil discharge port. Thus, the injection piston can be braked while discharging the hydraulic oil from the second oil discharge port even when the first oil discharge port is blocked.

An aspect of the present disclosure is the injection apparatus described above, in which it is preferable that the first oil discharge port is disposed at a position blocked by the injection piston when the injection apparatus is switched from an injection process to a pressure holding process. Thus, the injection piston can be braked while discharging the hydraulic oil from the second oil discharge port even when the first oil discharge port is blocked.

According to the present invention, it is possible to provide an injection apparatus for a highly durable metal injection molding machine capable of rapidly reducing a speed of an injection piston.

The above and other objects, features and advantages of the present disclosure will become more fully understood from the detailed description given hereinbelow and the accompanying drawings which are given by way of illustration, and thus are not to be considered as limiting the present disclosure.

DESCRIPTION OF EMBODIMENTS

Figure 1:
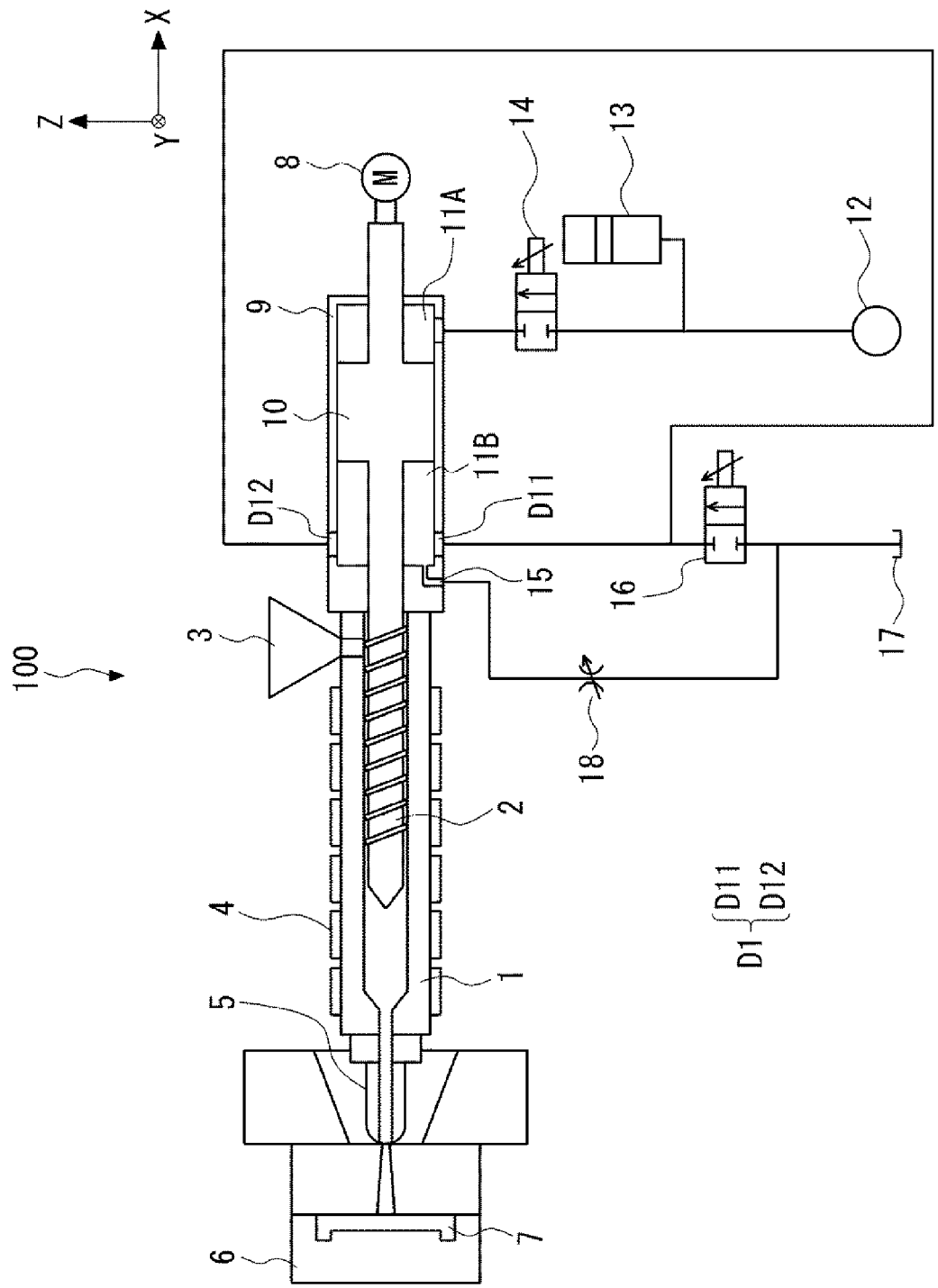
FIG. 1 is a diagram showing a schematic configuration of an injection apparatus of a metal injection molding machine according to a first embodiment.

Hereinafter, embodiments of the present disclosure will be described with reference to the drawings. However, the present disclosure is not limited to the following embodiments. In order to clarify the description, the following description and drawings are appropriately simplified. In addition, the same elements are denoted by the same reference numerals, and the redundant description will be omitted.

First Embodiment

An injection apparatus according to a first embodiment will be described. FIG. 1 is a diagram showing a schematic configuration of an injection apparatus of a metal injection molding machine according to the first embodiment. The injection apparatus 100 shown in FIG. 1 includes a heating barrel 1 and a screw 2 disposed inside the heating barrel 1 so as to be freely driven in an axial direction and a rotational direction. Molding material is charged from a hopper 3 into the heating barrel 1, and the charged material is molten by frictional heat and shear heat generated due to rotation of the screw 2 and heat applied from a heater 4 disposed on the outer periphery of the heating barrel 1. The molten material is kneaded by the rotation of the screw 2 and sent to the front of the heating barrel 1 (−X direction). A nozzle 5 is attached to a tip of the heating barrel 1. When the material is injected, the molten molding material held at the tip of the heating barrel 1 is injected through the nozzle 5 into a cavity 7 of a mold 6 that is closed.

The screw 2 is rotationally driven by a motor 8 and axially driven by an injection piston 10 disposed inside an injection hydraulic cylinder 9.

The injection hydraulic cylinder 9 is partitioned into two chambers by the injection piston 10, and a front chamber 11B is disposed in a front portion (−X side) and a rear chamber 11A is disposed in a rear portion (+X Side). The pressure oil accumulated to the accumulator 13 by a hydraulic pump 12 is provided to the rear chamber 11A through a flow control valve 14.

In FIGS. 1 to 12, a right-handed Cartesian coordinate system is used. A direction from the front chamber 11B to the rear chamber 11A along a center axis of the injection piston 10 is defined as an X-direction, and a vertical direction from bottom to top of planes is defined as a Z-direction. A direction orthogonal to the X-direction and the Z-direction in the left-handed Cartesian coordinate system is defined as a Y-direction. In FIGS. 1, 2, 4, 5 and 7 to 12, a normal direction from front to back of the planes thereof is the Y-direction, and in FIGS. 3 and 6, a horizontal direction from right to left of the plane is the Y-direction.

Figure 2:
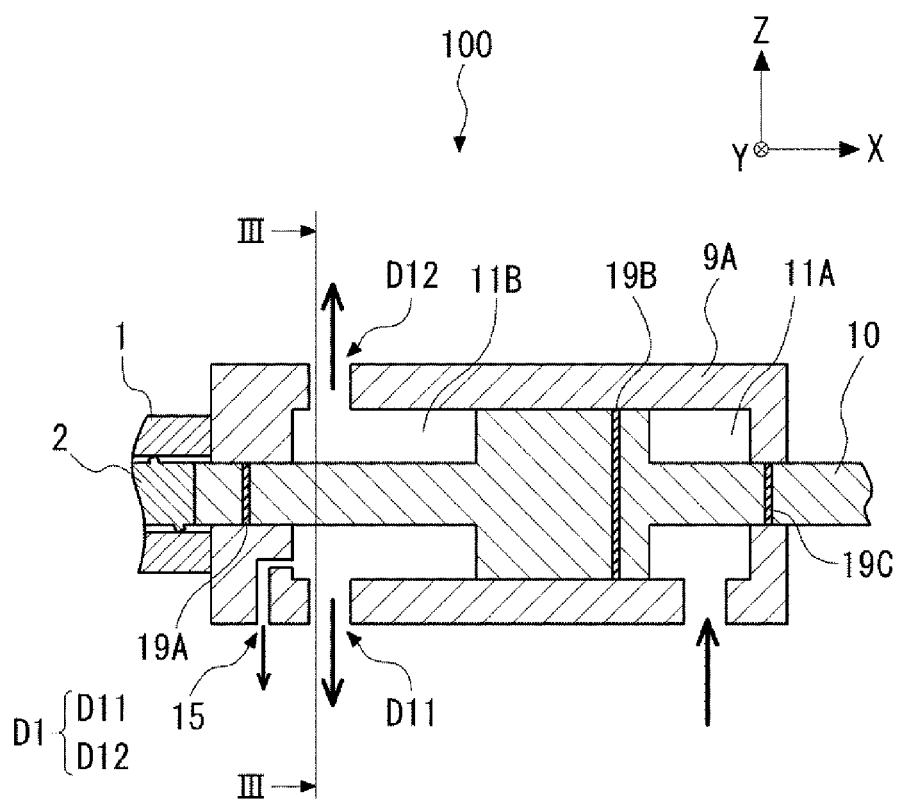
FIG. 2 is an enlarged view of a region near a front chamber of the injection apparatus according to the first embodiment.

A configuration of the front chamber 11B will be specifically described below. FIG. 2 is an enlarged view in the vicinity of the front chamber 11B of the injection apparatus 100. The front chamber 11B is provided with a first oil discharge port D1 completely or mostly blocked by the injection piston 10 at a desired holding pressure switching position of the injection piston 10, and a second oil discharge port 15 not blocked by the injection piston 10 even at the most forward position of the injection piston 10.

In FIG. 2, sealing members 19A to 19C such as guide rings and oil seals are provided to prevent leakage of hydraulic oil. The sealing member 19A is disposed to seal between an inner surface of an opening on the −X side of a housing 9A and a shaft connected to the injection piston 10. The sealing member 19B is disposed to seal between the inner surface of the housing 9A and the injection piston 10. The sealing member 19C is disposed to seal between the inner surface of the opening on the +X side of the housing 9A and the shaft connected to the injection piston 10.

Figure 3:
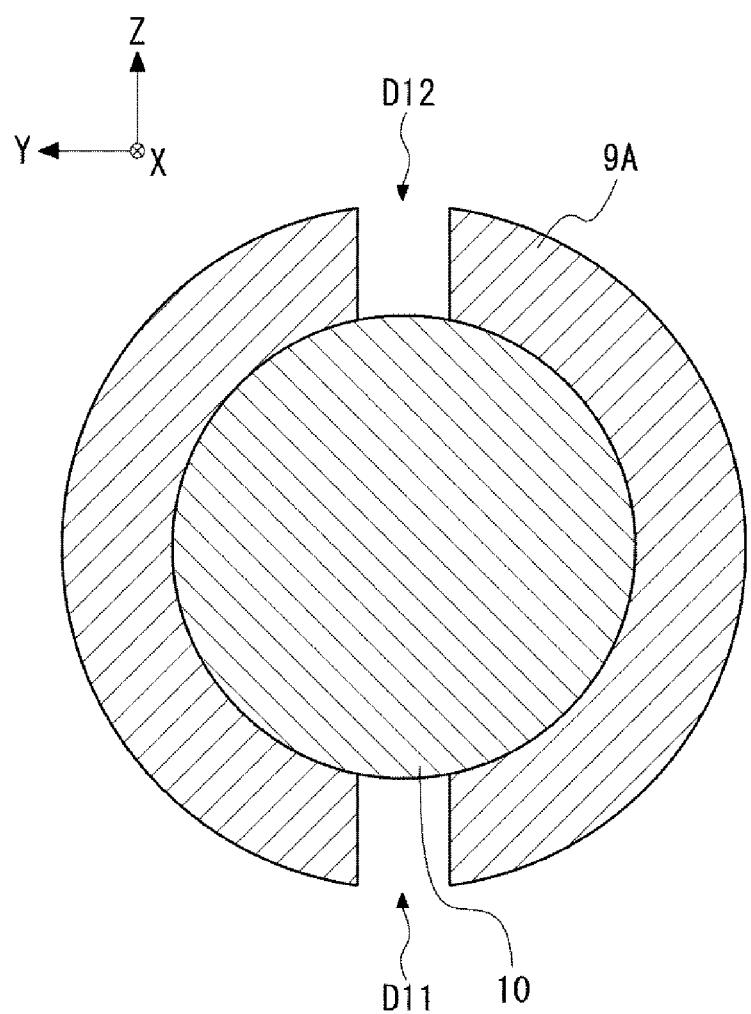
FIG. 3 illustrates a cross-sectional shape of a first oil discharge port in a line of FIG. 2.

FIG. 3 shows a cross-sectional shape of the first oil discharge port D1 along III-III line in FIG. 2. The first oil discharge port D1 includes two oil discharge ports D11 and D12 formed in a side face part of the injection hydraulic cylinder 9 so as to face each other. In other words, the first oil discharge ports D11 and D12 are disposed at positions symmetrical with respect to the central axis of the injection piston. The first oil discharge ports D11 and D12 are connected to an oil tank 17 through a flow control valve 16, and have an opening area large enough to discharge the hydraulic oil stored in the front chamber 11B to the oil tank 17 in an injection process described later. In other words, the first oil discharge ports D11 and D12 are connected to each other and function as similar oil discharge mechanisms.

The second oil discharge port 15 is formed at an end face part of the injection hydraulic cylinder 9. The second oil discharge port 15 is connected through a flow control valve 18 to the oil tank 17, and in a pressure holding process described later, the hydraulic oil in the front chamber 11B is discharged into the oil tank 17. As long as the hydraulic oil can be flowed at a flow rate in the pressure holding process and at a flow rate for retreating the injection piston 10 (+X direction) in a measuring process described later through the second oil discharge port 15, the opening area of the second oil discharge port 15 may be smaller than that of the first oil discharge port D1. For example, the opening area of the second oil discharge port 15 may be ¹/₁₀ or less of the opening area of the first oil discharge port D1.

Next, injection molding by the injection apparatus 100 will be described. Injection molding mainly includes the measuring process, the injection process, and the pressure holding process. Hereinafter, each process will be described.

The measuring process is a process of measuring the material to be filled into the cavity. In this process, solid molding material is fed from the hopper 3 into the heating barrel 1, and the screw 2 is driven rearward in the axial direction (+X Direction) by the injection hydraulic cylinder 9 while being rotationally driven by the motor 8. Thus, the material is sent to the front of the screw 2 in a molten state inside the heating barrel 1. By measuring an amount of movement of the screw 2, the material fed into the heating barrel 1 can be measured.

The injection process is a process of filling material into the cavity 7. In the injection process, when a measured value reaches a predetermined value, the screw 2 is driven forward in the axial direction by providing the pressure oil to the injection hydraulic cylinder 9, and the measured molten material is injected from the nozzle 5 into the cavity 7 of the mold 6. In a case of injection-molding of alloy material, if the molten material is not injected at a relatively high speed, the molten metal is rapidly cooled and the filling of the cavity 7 becomes insufficient. Therefore, in general injection molding for metallic material, the accumulator 13 is used as a source providing the pressure oil to the injection hydraulic cylinder 9, and the screw 2 is driven at a high speed (e.g. 1 to 5 m/s) in the axial direction to inject the molten material.

The pressure holding process is a process of applying pressure to the material filled in the cavity 7 by keeping the pressure applied to the material remaining in the heating barrel 1 in order to compensate for shrinkage caused by cooling of the material after the injection of the material has been finished. Thereafter, the material in the cavity 7 is cooled while applying the pressure to the material. Thus, the material can be molded into a desired shape of the cavity 7.

At this time, if switching from the injection process to the pressure holding process is performed too early, the filling of the material into the cavity 7 becomes insufficient, and a short shot (Unfilled) or shrinkage occurs in a molded product. If the switching from the injection process to the pressure holding process is performed too late, the filling of the material into the cavity 7 becomes excessive, burrs are generated, and the durability of the injection apparatus 100 and that of the mold 6 are lowered. Therefore, in the injection molding, the pressure holding switching position at the end of the injection needs to be kept constant.

Hereinafter, a switching operation from the injection process to the pressure holding process in the present embodiment will be described in detail. In the present embodiment, in the injection process, when the hydraulic oil is provided to the rear chamber 11A of the injection hydraulic cylinder 9 from the accumulator 13, the injection piston 10 advances in the injection direction (−X direction) while the hydraulic oil is discharged from the first oil discharge ports D11 and D12 of the front chamber 11B. Thereafter, when the injection piston 10 reaches the holding pressure switching position, the first oil discharge ports D11 and D12 are completely or substantially blocked by the injection piston 10.

Figure 4:
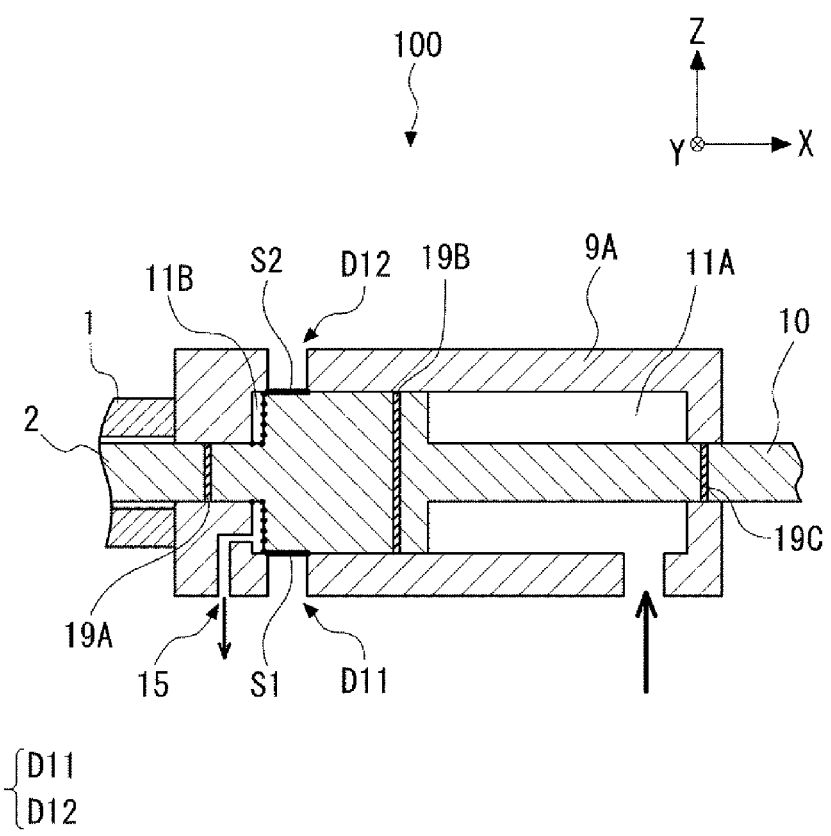
FIG. 4 is a diagram showing a state in which an injection piston blocks the first oil discharge port in the injection apparatus according to the first embodiment.

FIG. 4 shows the injection apparatus 100 in a state in which the injection piston 10 blocks the first oil discharge ports D11 and D12. At this time, the pressure applied to side face parts S1 and S2 of the injection piston 10 exposed by the first oil discharge ports D11 and D12 becomes low (For example, atmospheric pressure). Since the first oil discharge ports D11 and D12 are formed at positions opposed to each other, parts of a side surface of the injection piston 10 to which the low pressure applied (Indicated by thick lines) are disposed so as to face each other, and an eccentric load is not applied to the injection piston 10.

On the other hand, the hydraulic oil discharged from the second oil discharge port 15 is controlled by the flow control valve 18 inserted into a pipeline connecting the second oil discharge port 15 and the oil tank 17 so that the hydraulic oil at a necessary flow rate is discharged during the pressure holding process.

In the present configuration, at any injection speed, when the first oil discharge ports D11 and D12 are blocked by the injection piston 10 (When the injection piston 10 reaches the holding pressure switching position), the discharge of the hydraulic oil from the front chamber 11B is restricted, and a brake pressure (Indicated by dashed lines) is immediately generated. Thus, the injection piston 10 can be rapidly decelerated. The switching position from the injection process to the pressure holding process (Holding pressure switching position) can be a fixed position where the injection piston 10 blocks the first oil discharge ports D11 and D12.

Since the holding pressure switching position is the fixed position, a switching timing of the holding pressure applied to the molded product can be controlled by adjusting a measuring completion position.

Further, by setting the discharge flow rate of the flow control valve 18 to a value capable of achieving the pressure to be held in the pressure holding process, after the injection piston 10 is decelerated, the hydraulic oil can be discharged through the flow control valve 18 from the second oil discharge port 15 at a desired flow rate. Thus, it is possible to smoothly switch the process from the injection process to the pressure holding process by controlling the pressure of the pressure oil provided to the rear chamber 11A. The discharge flow rate of the hydraulic oil from the second oil discharge port 15 may be adjusted by appropriately setting the number of the second oil discharge ports 15 and the opening area thereof, instead of using the flow control valve 18 as described above.

As described above, in the present configuration, it is possible to prevent the eccentric load from being applied to the injection piston during deceleration of the injection piston.

Therefore, according to the present configuration, it is possible to advantageously prevent breakage of the injection piston, and eccentric wear and breakage of peripheral parts such as the guide ring and the oil seal supporting the injection piston due to the eccentric load.

Second Embodiment

Figure 5:
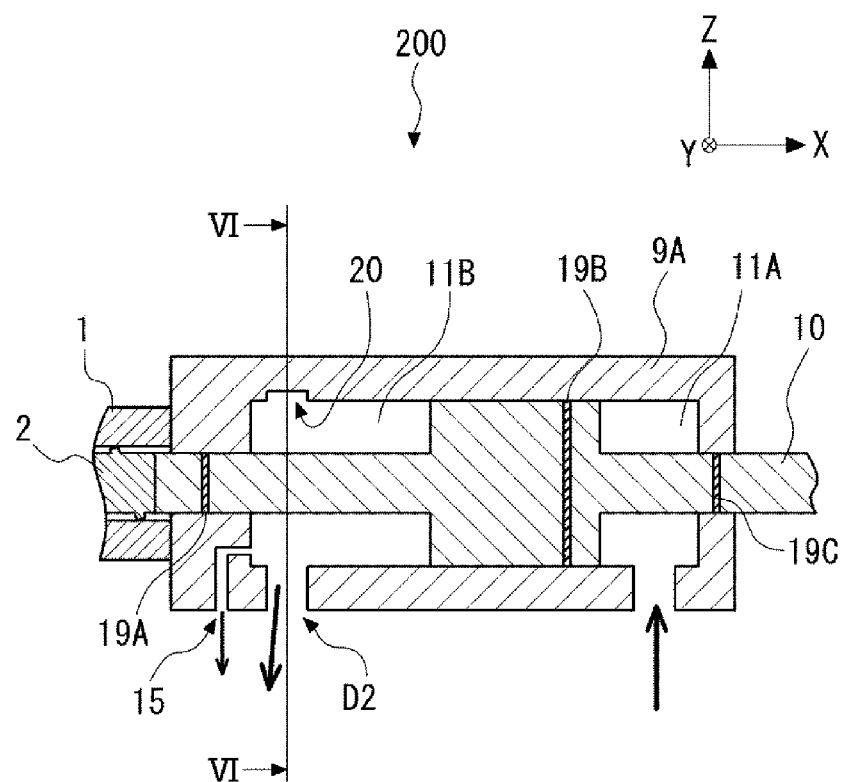
FIG. 5 is an enlarged view of a region near a front chamber of an injection apparatus according to a second embodiment.

Next, an injection apparatus 200 according to a second embodiment will be described. A configuration of the injection apparatus 200 is the same as that of the injection apparatus 100 except that a configuration of a first oil discharge port is different from that of the injection apparatus 100. FIG. 5 is an enlarged view in the vicinity of the front chamber of the injection apparatus 200 according to the second embodiment.

In the injection apparatus 200, the front chamber 11B is provided with a first oil discharge port D2 similar to the first oil discharge port D11 of the injection apparatus 100. In the housing 9A of the injection hydraulic cylinder 9, an annular groove 20 connected to the first oil discharge port D2 is disposed as a flow path of the hydraulic oil.

Figure 6:
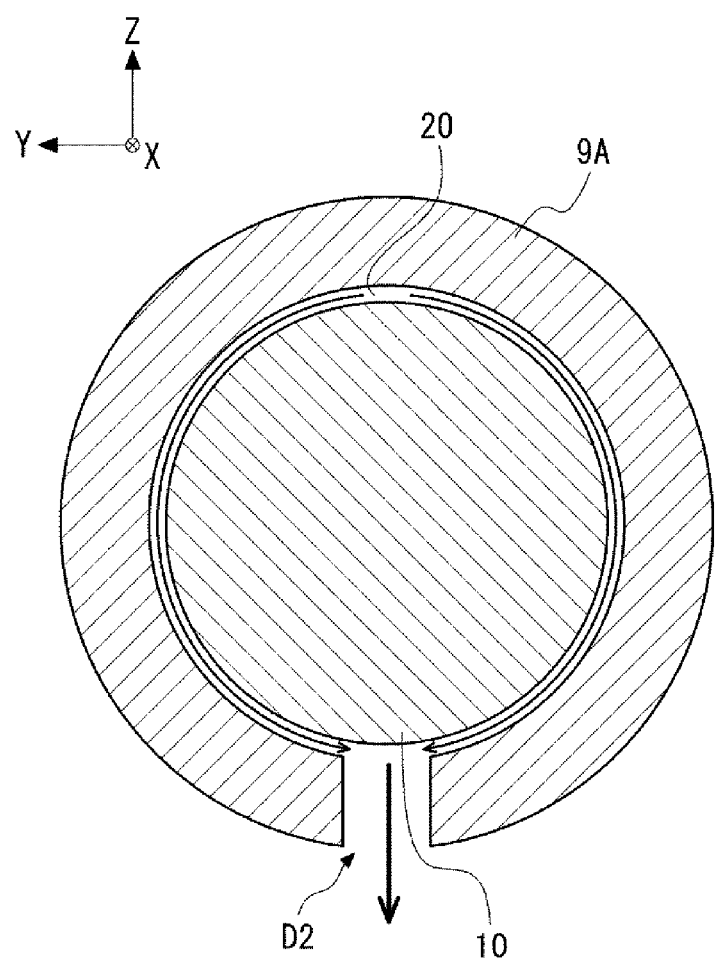
FIG. 6 shows a cross-section of an annular groove in a line VI-VI of FIG. 5.

FIG. 6 shows a cross section of the annular groove 20 along the line VI-VI of FIG. 5. The annular groove 20 is formed on the inner surface of the cylindrical housing 9A as a groove on an annular ring so as to surround the injection piston 10. A part of the annular groove 20 is connected to the first oil discharge port D2.

Hereinafter, a switching operation from the injection process to the pressure holding process in the present embodiment will be described in detail. When the injection piston 10 reaches the holding pressure switching position, the first oil discharge port D2 is completely or mostly blocked by the injection piston 10.

Figure 7:
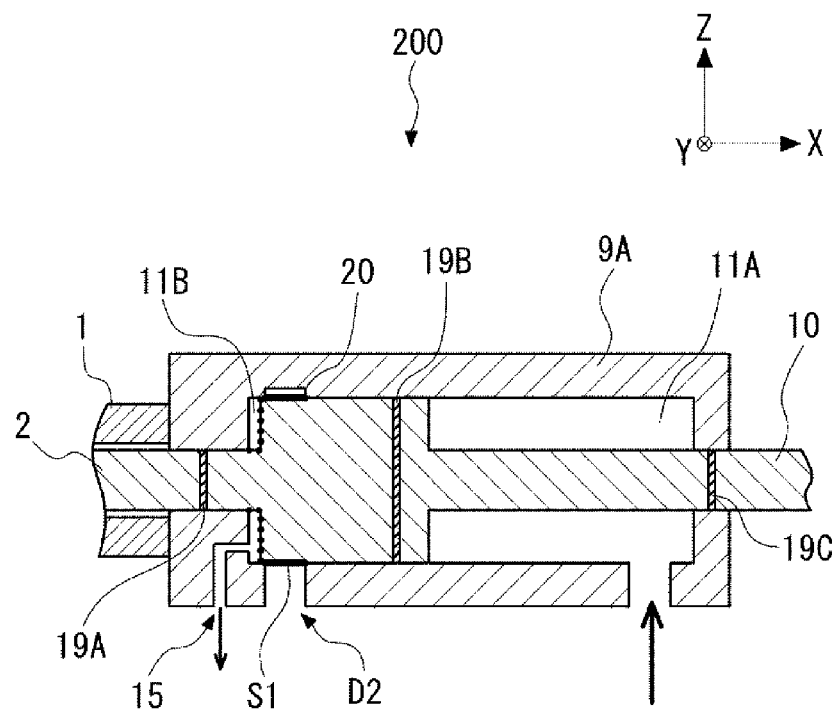
FIG. 7 is a diagram showing a state in which an injection piston blocks a first oil discharge port in the injection apparatus according to the second embodiment.

FIG. 7 shows the injection apparatus 200 in a state in which the injection piston 10 blocks the first oil discharge port D2. At this time, the pressure applied to the side face part S1 of the injection piston 10 exposed by the first oil discharge port D2 becomes low (For example, atmospheric pressure) (Indicated by thick lines). In the present configuration, the annular groove 20 connected to the first oil discharge port D2 is disposed on the housing 9A. Since the annular groove 20 functions as an oil discharge mechanism connected to the first oil discharge port D2, the side surface of the injection piston 10 exposed by the annular groove 20 is at a low pressure (Atmospheric pressure) like the side face part S1 (Indicated by thick lines). Therefore, the eccentric load in the direction of shifting the injection piston 10 from the central axis is not generated.

Therefore, according to the present configuration, it is possible to prevent the eccentric load from being applied to the injection piston during deceleration of the injection piston. Thus, it is possible to advantageously prevent the breakage of the injection piston, and the eccentric wear and the breakage of the peripheral parts such as the guide ring and the oil seal supporting the injection piston due to the eccentric load.

Third Embodiment

Figure 8:
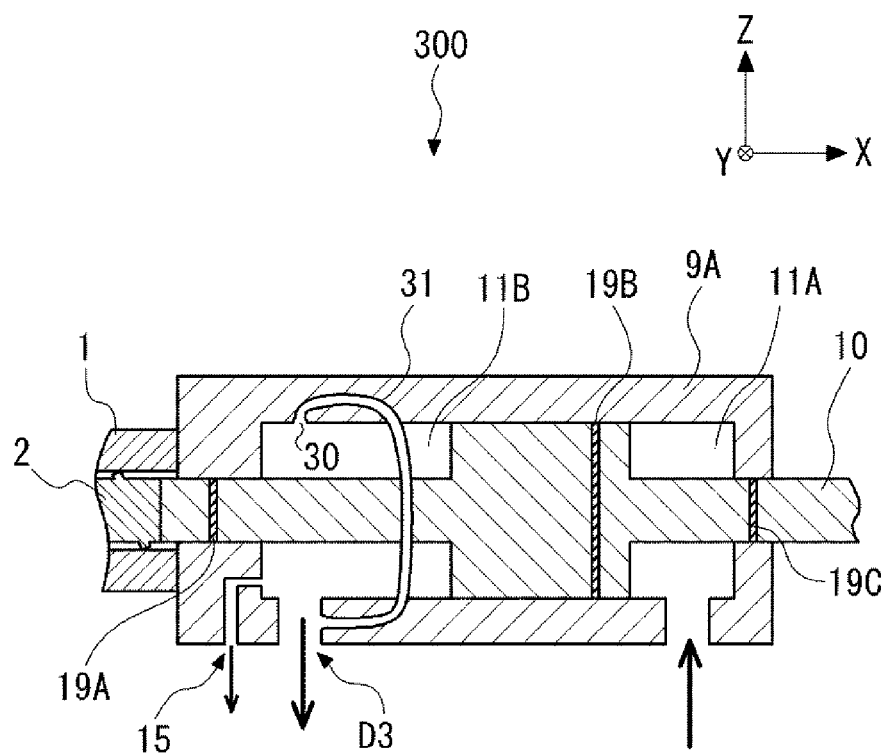
FIG. 8 is an enlarged view of a region near a front chamber of an injection apparatus according to a third embodiment.

Next, an injection apparatus 300 according to a third embodiment will be described. A configuration of the injection apparatus 300 is the same as that of the injection apparatus 100 except that a configuration of a first oil discharge port is different from that of the injection apparatus 100. FIG. 8 is an enlarged view in the vicinity of the front chamber of the injection apparatus 300 according to the third embodiment.

In the injection apparatus 300, the front chamber 11B is provided with a first oil discharge port D3 similar to the first oil discharge port D11 of the injection apparatus 100. The housing 9A of the injection hydraulic cylinder 9 is provided with a recess 30 at a position opposed to the first oil discharge port D3. The recess 30 is connected to the first oil discharge port D3 through a pipe 31. Although the size and shape of the recess 30 are not particularly limited, the opening area of the recess 30 is smaller than that of the first oil discharge port D3 in the example of FIG. 8.

The pipe 31 may pass through any path that does not interfere with the injection molding as long as the first oil discharge port D3 can be connected to the recess 30. As long as it is possible in a manufacturing process of the housing 9A of the injection hydraulic cylinder 9, the pipe 31 may be passed inside the housing 9A, or a flow path (Channel) corresponding to the pipe 31 may be formed in the housing 9A. In other words, the first oil discharge port D3 and the recess 30 may be connected to each other by any flow path capable of transporting the hydraulic oil.

The pipe 31 may be composed of any material. The connection between the first oil discharge port D3 and the pipe 31 may be located at any position, and for example, as shown in FIG. 8, the pipe 31 may be connected to a side surface of the first oil discharge port D3.

Hereinafter, a switching operation from the injection process to the pressure holding process in the present embodiment will be described in detail. When the injection piston 10 reaches the holding pressure switching position, the first oil discharge port D3 is completely or mostly blocked by the injection piston 10.

Figure 9:
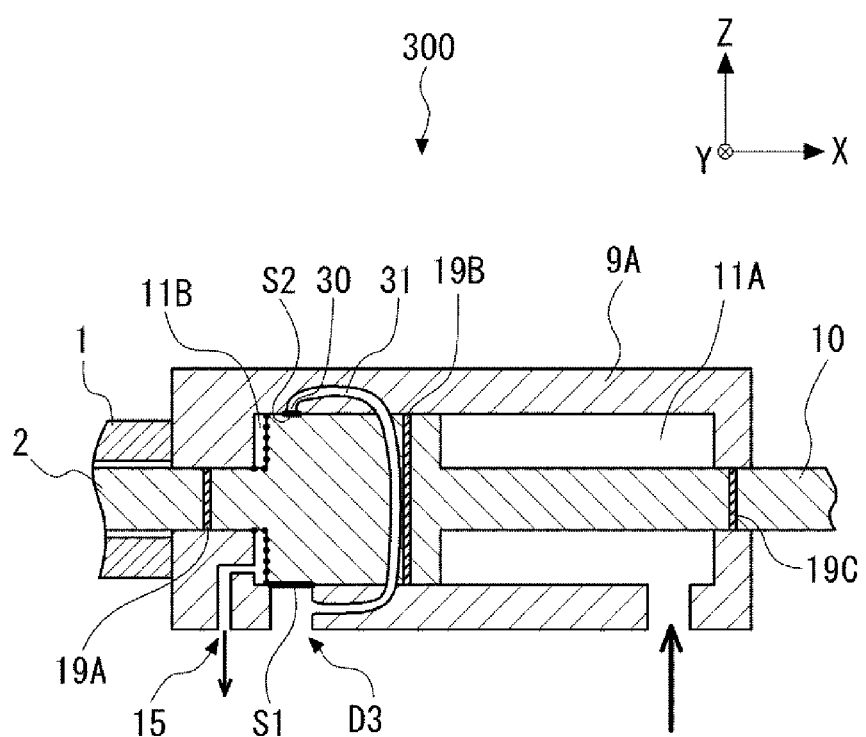
FIG. 9 is a view showing a state in which an injection piston blocks a first oil discharge port in the injection apparatus according to the third embodiment.

FIG. 9 shows the injection apparatus 300 in which the injection piston 10 blocks the first oil discharge port D3. At this time, the pressure applied to the side face part S1 of the injection piston 10 exposed by the first oil discharge port D3 becomes low (For example, atmospheric pressure) (Indicated by thick lines). Further, in the present configuration, the recess 30 is provided at a position opposed to the first oil discharge port D3, and the first oil discharge port D3 and the recess 30 are connected by the pipe 31. Thus, since the recess 30 and the pipe 31 function as the oil discharge mechanism connected to the first oil discharge port D3, the first oil discharge port D3 and the recess 30 are at the same low pressure. Therefore, the side face part S2 of the injection piston 10 that is opposed to the recess 30 is also at the low pressure like the opposite side face part S1 (Indicated by thick lines). Accordingly, as in the case of the first embodiment, since it is possible to cause the opposite side face parts of the injection piston 10 to be at the low pressure in the same manner, the eccentric load applied to the injection piston 10 can be reduced.

Therefore, according to the present configuration, it is possible to prevent the eccentric load from being applied to the injection piston during deceleration of the injection piston. Thus, it is possible to advantageously prevent the breakage of the injection piston, and the eccentric wear and breakage of the peripheral parts such as the guide ring and the oil seal supporting the injection piston due to the eccentric load.

As described above, the size and shape of the recess are not particularly limited, and the size and shape of the recess may be the same as the opening area and the opening shape of the first oil discharge port D3.

Figure 10:
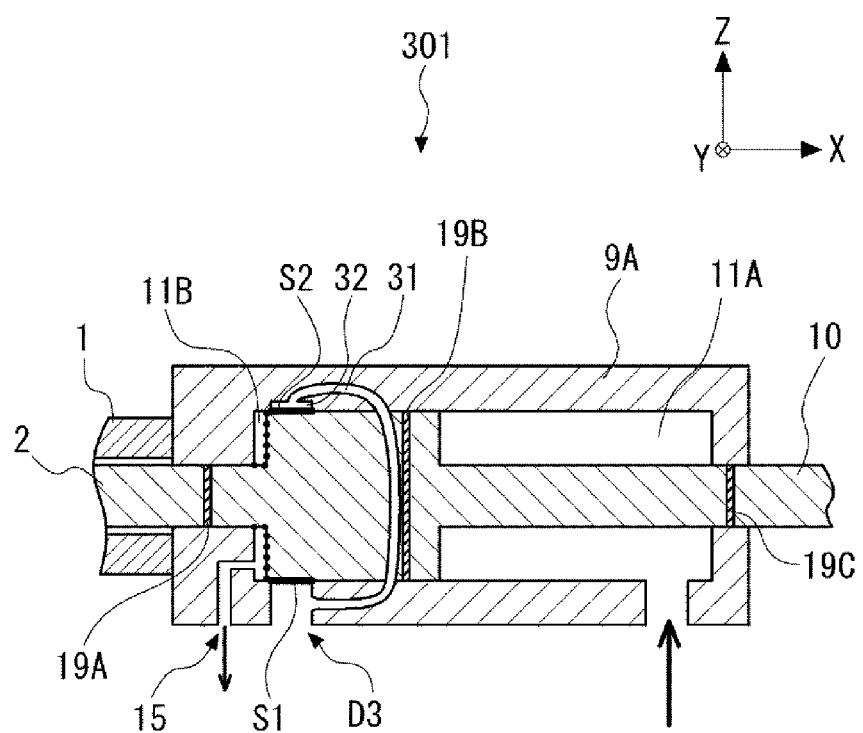
FIG. 10 is a view showing a case in which a size and shape of a recess are the same as an opening area and an opening shape of the first oil discharge port in the injection apparatus according to the third embodiment.
Figure 11:
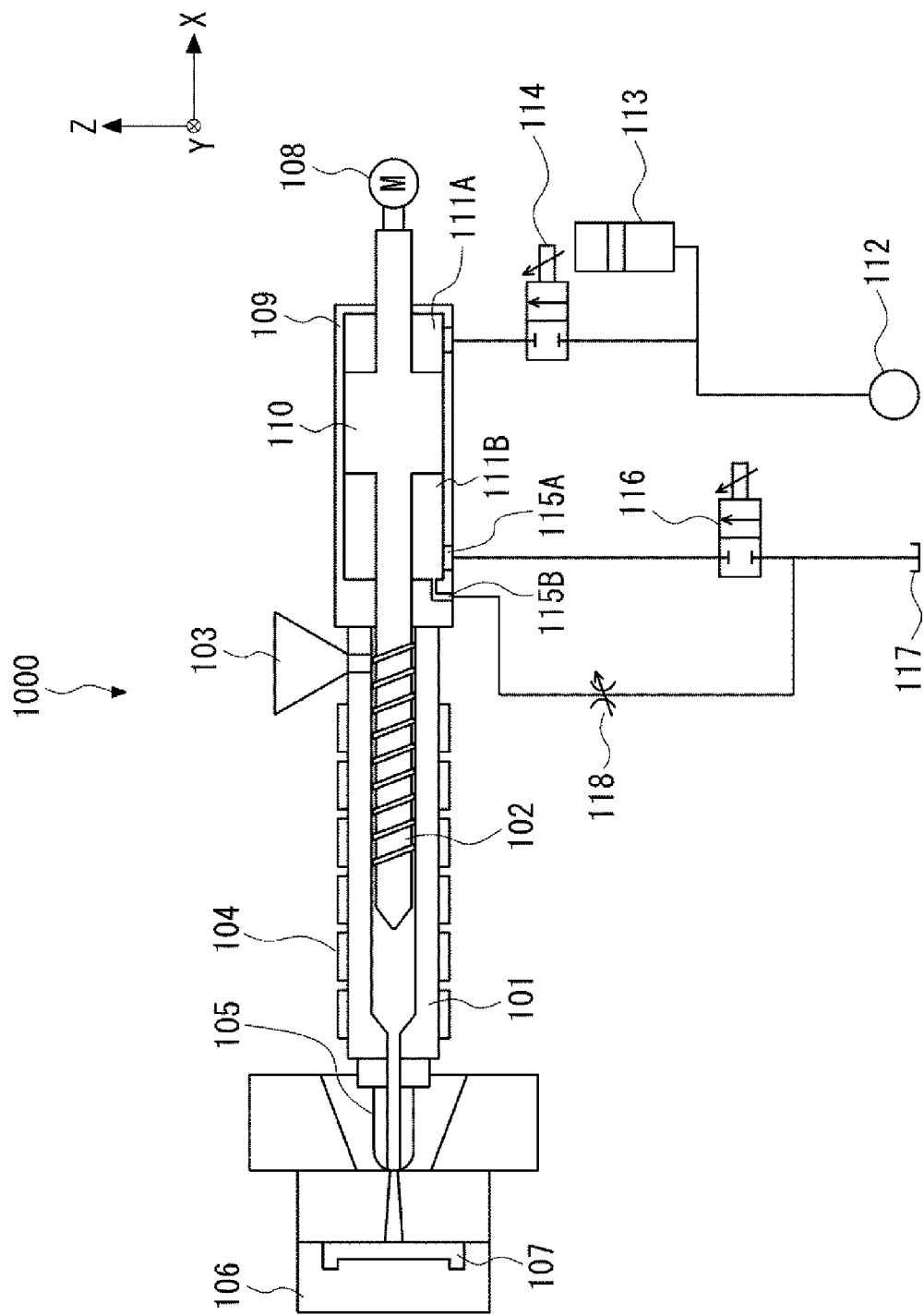
FIG. 11 shows a schematic configuration of an injection apparatus for a metal injection molding machine.
Figure 12:
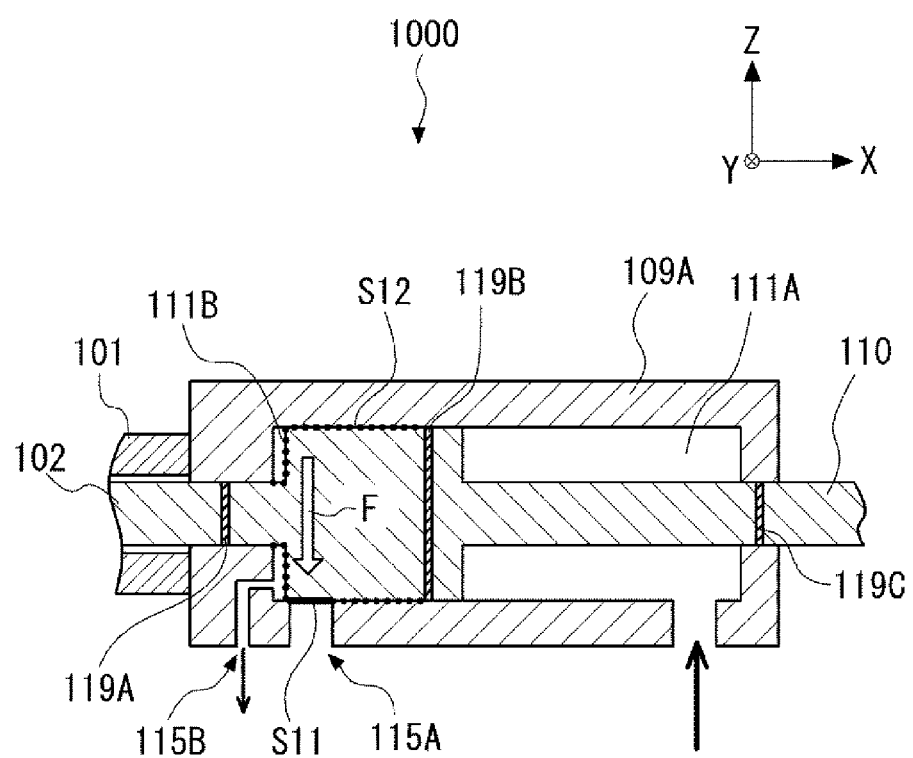
FIG. 12 shows an injection piston blocking a first oil discharge port in a general injection apparatus.

FIG. 10 shows a case in which the size and shape of the recess are the same as the opening area and the opening shape of the first oil discharge port D3 in the injection apparatus according to the third embodiment. In the injection apparatus 301 shown in FIG. 10, instead of the recess 30 of the injection apparatus 300 shown in FIGS. 8 and 9, a recess 32 whose size and shape are the same as the opening area and shape of the first oil discharge port D3 is disposed.

In FIG. 10, when the injection piston 10 reaches the holding pressure switching position, the first oil discharge port D3 is completely or mostly blocked by the injection piston 10. Similar to the configuration shown in FIGS. 8 and 9, the first oil discharge port D3 and the recess 32 are at the low pressure (Indicated by thick lines), and the side face part S2 of the injection piston 10 on which the recess 32 faces is also at the low pressure like the opposite side face part S1 (Indicated by thick lines).

Further, in the present configuration, since the side face parts S1 and S2 have the same shape and size, the pressure applied to the side surface S1 and the pressure applied to the side surface S2 are more balanced. Therefore, according to the configuration of FIG. 10, the generation of the eccentric load can be further suppressed as compared with the configuration shown in the configurations of FIGS. 8 and 9.

Other Embodiments

The present disclosure is not limited to the above-described embodiments, and can be appropriately changed without departing from the scope of the present disclosure. For example, although the two first oil discharge ports or one first oil 5 discharge port and the recess has been disposed along the vertical direction (Z direction) in the above-described embodiments, it should be appreciated that they may be arranged along a direction other than the vertical direction as long as they are arranged to face each other.

What is claimed is:
1. An injection apparatus comprising:
  a heating barrel;
  a screw configured to be capable of being driven along an axial direction of the heating barrel and disposed in the heating barrel to be rotatable around the axial direction;
  an injection piston configured to be connected to the screw to drive the screw in the axial direction;
  an injection hydraulic cylinder configured to drive the injection piston housed therein in the axial direction by hydraulic pressure, inside of the injection hydraulic cylinder being partitioned into a first chamber in which pressured hydraulic oil for driving the injection piston is provided and a second chamber from which hydraulic oil is discharged;

a first oil discharge port disposed in the second chamber to be blocked by the injection piston when the injection piston advances to a holding pressure switching position and configured to directly discharge the hydraulic oil from the second chamber;

a second oil discharge port disposed in the injection hydraulic cylinder in such a manner that the hydraulic oil can be discharged from the second chamber regardless of a position of the injection piston; and an oil discharge mechanism disposed in the second chamber at a position opposed to the first oil discharge port with respect to a center axis of the injection hydraulic cylinder, wherein the oil discharge mechanism is configured as a continuous annular groove formed along an inner surface of the injection hydraulic cylinder so as to surround the injection piston and so as to connect directly with the first oil discharge port, the annular groove forming a flow path in the injection hydraulic cylinder that annually extends around the central axis of the injection hydraulic cylinder from a position opposed to the first oil discharge port to the first oil discharge port to allow the hydraulic oil to flow from the position opposed to the first oil discharge port toward the first oil discharge port and be discharged from the second chamber directly through the first oil discharge port.

2. An injection apparatus comprising:

a heating barrel;

a screw configured to be capable of being driven along an axial direction of the heating barrel and disposed in the heating barrel to be rotatable around the axial direction;

an injection piston configured to be connected to the screw to drive the screw in the axial direction;

an injection hydraulic cylinder configured to drive the injection piston housed therein in the axial direction by hydraulic pressure, inside of the injection hydraulic cylinder being partitioned into a first chamber in which pressured hydraulic oil for driving the injection piston is provided and a second chamber from which hydraulic oil is discharged;

a first oil discharge port disposed in the second chamber to be blocked by the injection piston when the injection piston advances to a holding pressure switching position and configured to discharge the hydraulic oil from the second chamber;

a second oil discharge port disposed in the injection hydraulic cylinder in such a manner that the hydraulic oil can be discharged from the second chamber regardless of a position of the injection piston; and an oil discharge mechanism disposed in the second chamber at a position opposed to the first oil discharge port with respect to a center axis of the injection hydraulic cylinder, wherein the oil discharge mechanism comprises:

an opening formed in an inner surface of the injection hydraulic cylinder and disposed in the second chamber at a position opposed to the first oil discharge port with respect to the central axis of the injection hydraulic cylinder; and a pipe connected to a side surface of the first oil discharge port and configured to pass through an inside portion of the injection hydraulic cylinder, the pipe connecting the opening with the first oil discharge port to allow the hydraulic oil to exit the second chamber through the opening and to flow from the second chamber to the pipe through the opening, and from the pipe to the first oil discharge port in order for the hydraulic oil to be discharged from the second chamber directly through the first oil discharge port.

3. The injection apparatus according to claim 2, wherein a shape and size of the opening are substantially the same as a shape and size of an opening of the first oil discharge port.

4. The injection apparatus according to claim 3, wherein a flow rate of the hydraulic oil in the second oil discharge port is smaller than a flow rate of the hydraulic oil in the first oil discharge port.

5. The injection apparatus according to claim 1, wherein the first oil discharge port is disposed at a position blocked by the injection piston when the injection apparatus is switched from an injection process to a pressure holding process.

* * * * *